UNITED STATES PATENT OFFICE.

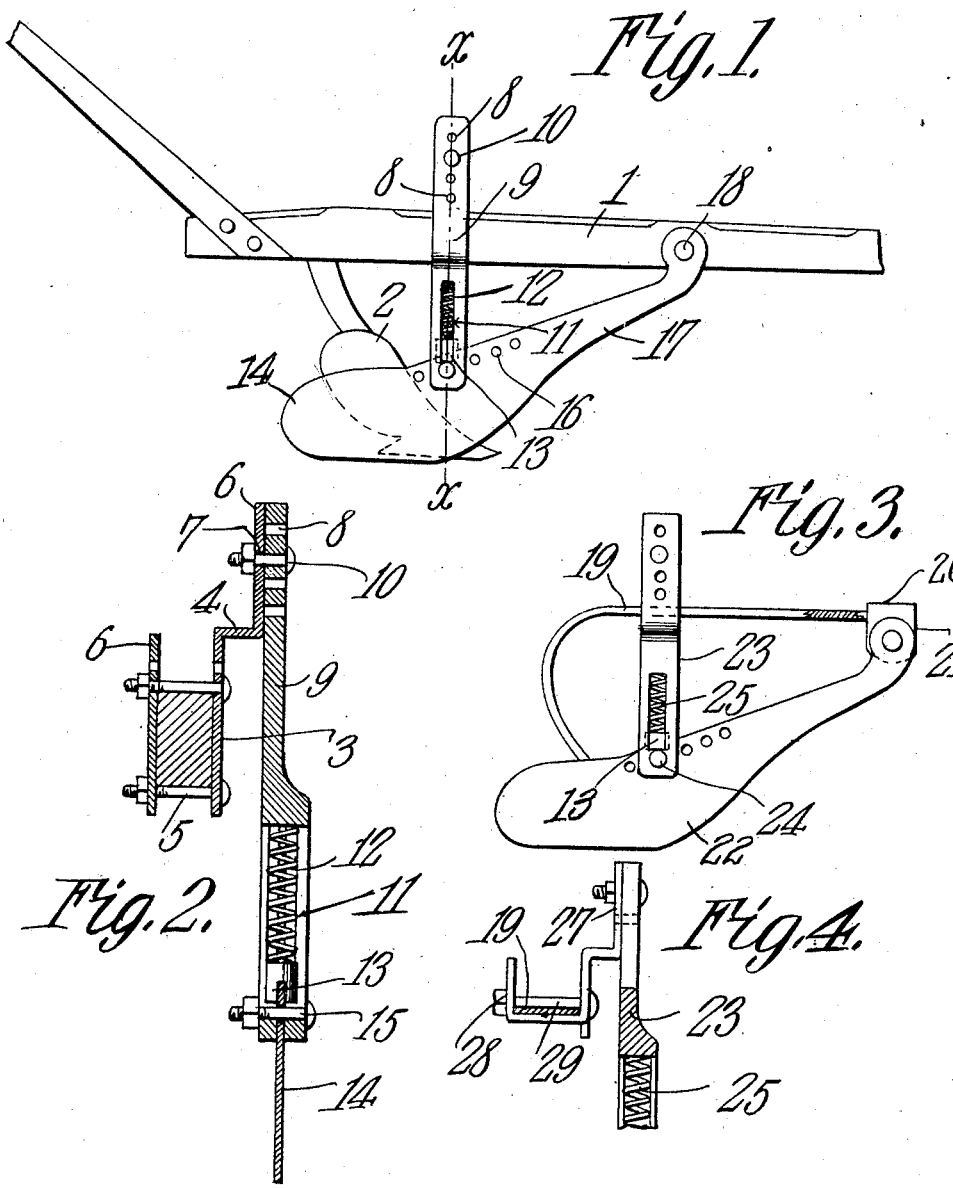

JOHN C. SKIDMORE, OF GRAPELAND, TEXAS.

PLOW-FENDER.

No. 868,714.

Specification of Letters Patent.

Patented Oct. 22, 1907.

Application filed June 12, 1907. Serial No. 378,586.

*To all whom it may concern:*

Be it known that I, JOHN C. SKIDMORE, a citizen of the United States, residing at Grapeland, in the county of Houston and State of Texas, have invented a new and useful Plow-Fender, of which the following is a specification.

This invention relates to plow fenders and its object is to provide a simple and efficient device of this character which can be readily connected to an ordinary plow and which is designed to control the movement of the overturned soil so as to enable a plow to be moved close to a row of plants without danger of injuring them.

A still further object is to provide a fender which can be easily adjusted to permit a desired quantity of soil to pass thereunder and which will serve to deflect large lumps, stones, etc. back into the furrow formed by the plow to which it is attached.

Another object is to provide a fender capable of riding over any obstructions in the path thereof and having means whereby it will be automatically returned to its initial position.

With these and other objects in view the invention consists of certain novel features of construction and combinations of parts which will be hereinafter more fully described and pointed out in the claims.

In the accompanying drawings is shown the preferred form of the invention.

In said drawings: Figure 1 is a side elevation of a plow having the present improvements applied thereto. Fig. 2 is an enlarged section on line $x$—$x$, Fig. 1. Fig. 3 is a side elevation of a modified form of fender. Fig. 4 is a view partly in section and partly in elevation of the upper portion of said modified form.

Referring to the figures by characters of reference, 1 designates a plow beam to which a plow 2 is connected in the usual manner. Disposed upon one face of the beam is a plate 3 constituting the base of an upwardly extending angular bracket 4 and this base is fastened upon the beam in any preferred manner as by means of bolts 5 extending above and below the beam and engaging a holding plate or strap 6 upon the opposite face of the beam. Both the base 3 and the plate 6 are formed with a plurality of apertures so that the same can be fastened to beams of different sizes. The upwardly projecting portion or tongue 6 of the bracket is provided with one or more openings 7 designed to register with similar openings 8 formed within a hanger 9 and said hanger is designed to be fastened to the tongue 6 by means of bolt 10 extending through any one of the openings therein. The lower portion of the hanger is formed with a longitudinal slot 11 in which is arranged a coiled spring 12. This spring is designed to bear upon a saddle 13 adapted to strad- dle and bear upon the upper edge of a blade 14 constituting the body of the fender. A guide bolt or pin 15 extends through the blade 14 and is designed to travel within the slot 11. This guide pin is insertible into any one of a series of openings formed adjacent the upper edge of the blade. As shown in Fig. 1 this blade is formed with an integral stem 17 pivotally connected as at 18 to the beam 1 and the blade is so proportioned that the broad portion thereof is disposed at one side of the plow 2, the lower edge of said broad portion being preferably straight so as to properly lie upon the ground.

In using the fender herein described it is first necessary to adjust the hanger 9 so as to cause the blade 14 to normally rest upon or at a desired distance from the ground. When the plow is drawn forward the fender blade will serve to deflect the overturned soil and prevent it from falling upon rows of plants close to the fender. Should the fender strike an obstruction it will ride thereover, this action resulting in the raising of the guide pin 15 and the contraction of spring 12. Said spring will return the blade to its initial position as soon as the obstruction is passed. The entire blade is preferably formed of spring metal so that the same can, to a certain extent, yield when subjected to more than a predetermined lateral pressure.

As shown in Figs. 3 and 4 the fender can be constructed as an attachment to be placed upon a spring tooth of a harrow or cultivator. This modified construction comprises a tooth 19 having a plate 20 secured thereto and provided with an ear 21 to which the blade 22 is pivoted and said blade is connected to a hanger 23 by means of a pin 24 in the same manner as shown in Fig. 2. Spring 25 is located within the hanger and constantly bears upon a saddle 26 engaging the fender blade 22. The upper portion of the hanger 23 is adjustably connected to a tongue 27 extending from an angular bracket 28 designed to extend under the tooth 19 and to lap opposite faces of a beam. This bracket may be clamped upon the tooth by means of a bolt 29 extending from the side portions thereof and through the beam.

It will be seen that a fender constructed in the manner herein described is very simple, durable, and efficient and can not only be placed upon the market as a part of a plow but can be sold as a complete article designed to be secured to the beam of a plow, harrow, or the like.

What is claimed is:

1. The combination with a supporting bracket; of a hanger pivotally connected thereto, a pivotally supported fender blade slidably mounted within the hanger, a spring pressed saddle within the hanger and upon the blade, and an adjustable connection between the blade and hanger.

2. The combination with a supporting bracket; of a hanger pivotally connected thereto, a spring pressed saddle slidably mounted within the hanger, a pivotally supported fender blade engaged by the saddle and slidable within the hanger, and means adjustably engaging the fender blade for guiding the blade within the hanger.

3. The combination with a supporting member and a fender blade pivotally connected thereto; of a bracket upon said member, a slotted hanger pivotally and adjustably connected to the bracket, a spring pressed saddle slidably mounted within the hanger and bearing upon the blade, and means adjustably connected to the blade and movable within the slots for guiding the blade within the hanger.

In testimony that I claim the foregoing as my own, I have hereto affixed my signature in the presence of two witnesses.

JOHN C. SKIDMORE.

Witnesses:
J. N. PARKER,
JIM WEBB.